United States Patent [19]
Vanderveer

[11] 3,882,569
[45] May 13, 1975

[54] SECTIONAL HANDLE
[75] Inventor: Fredric B. Vanderveer, Grand Rapids, Mich.
[73] Assignee: Leigh Products, Inc., Coopersville, Mich.
[22] Filed: Aug. 16, 1974
[21] Appl. No.: 497,908

[52] U.S. Cl............ 16/114 R; 16/110 A; 24/115 H; 403/188; 403/326; 403/393
[51] Int. Cl................................................ F16b 9/02
[58] Field of Search.... 24/115 H, 81 CC; 16/110 A, 16/114 R, 114 A, 115; 403/104, 106, 109-112, 52, 384, 386, 326, 393, 188

[56] References Cited
UNITED STATES PATENTS

| | | | |
|---|---|---|---|
| 1,009,227 | 11/1911 | Rozir............................ | 16/114 A UX |
| 1,355,332 | 10/1920 | Hanson........................ | 16/114 A UX |
| 1,943,585 | 1/1934 | Cummins et al............. | 16/114 A |
| 2,637,884 | 5/1953 | Morehouse................... | 24/115 H |
| 2,862,217 | 12/1958 | Small et al.................... | 403/52 X |
| 2,876,028 | 3/1959 | Shoup........................... | 403/384 X |

Primary Examiner—Richard J. Scanlan, Jr.
Assistant Examiner—Wayne L. Shedd
Attorney, Agent, or Firm—Price, Heneveld, Huizenga and Cooper

[57] ABSTRACT

A sectional handle structure is disclosed. The handle consists of one or more sections of elongated, narrow loops of rod-like material having at least one closed end. Each section has a plate rigidly secured to one end. The plate has means forming a track or slideway of a width and height to snugly and slidably receive the end of another section or an appropriate projection on a utensil. The plate also has a resiliently deflectable end equipped with a stop and latch means for accurately positioning the sections with relation to each other when joined and a latch means to resist separation in the absence of a force applied for the specific purpose of causing separation.

11 Claims, 13 Drawing Figures

PATENTED MAY 13 1975   3,882,569
SHEET 1 OF 2
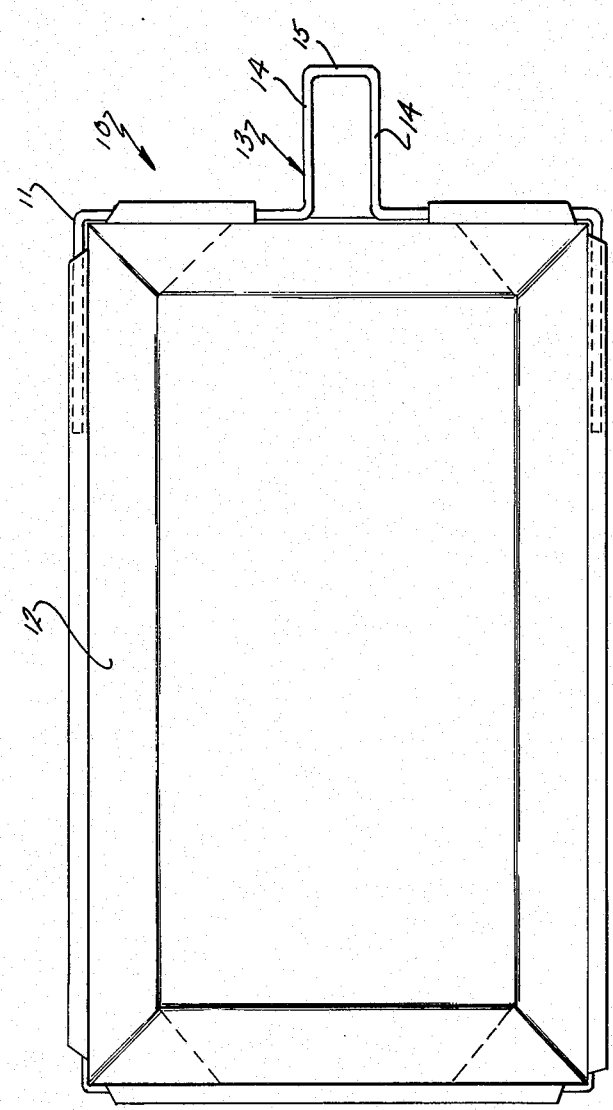
FIG. 2.
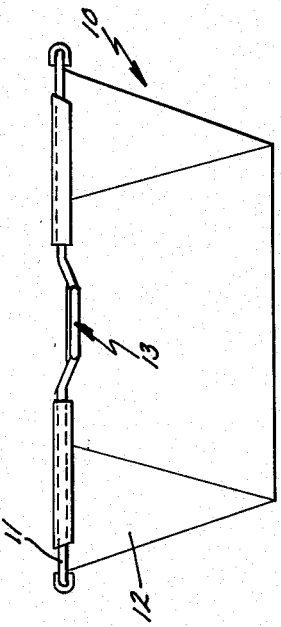
FIG. 3.
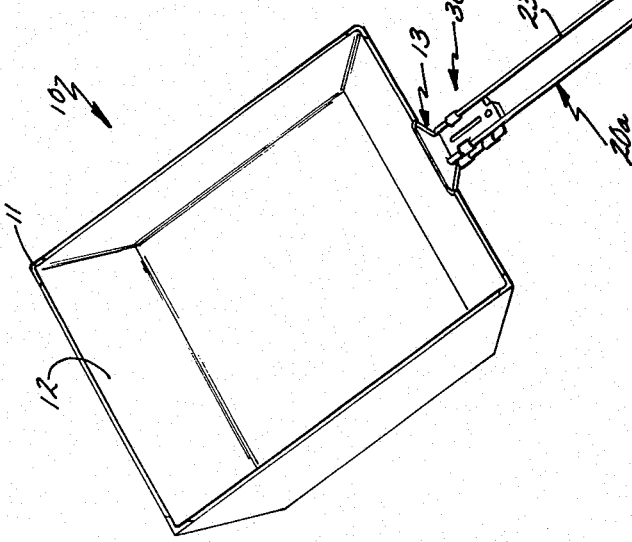
FIG. 1.
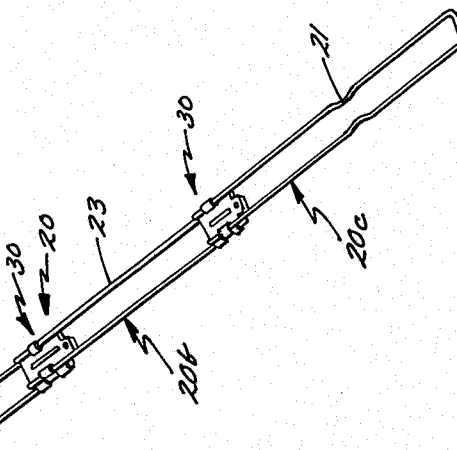

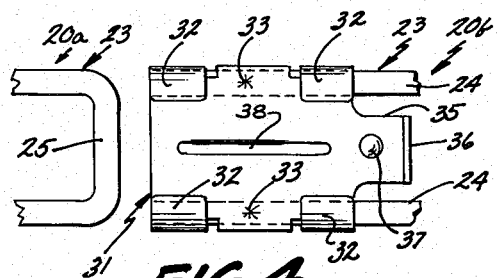
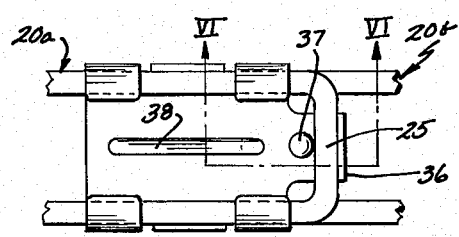
FIG. 4.  FIG. 5.
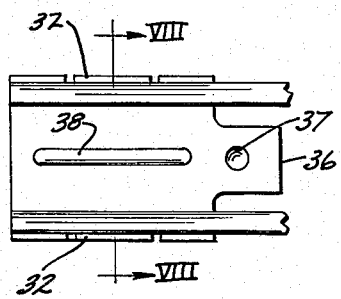 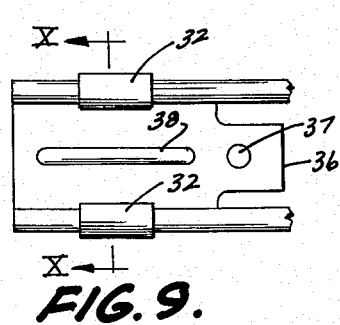 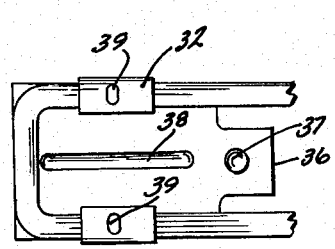
FIG. 7.  FIG. 9.  FIG. 11.
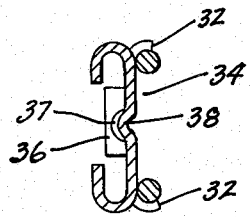 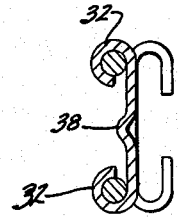 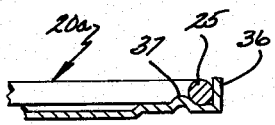
FIG. 8.  FIG. 10.  FIG. 6.
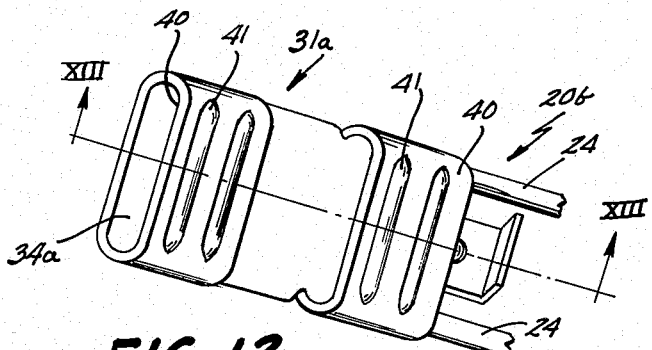
FIG. 12.
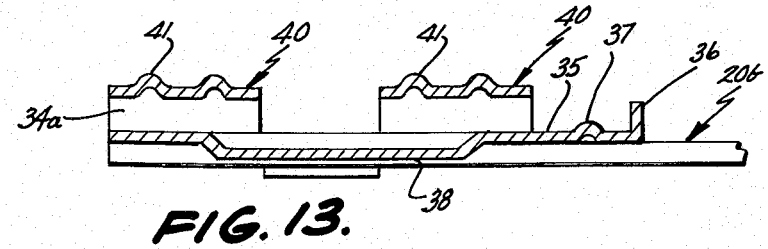
FIG. 13.

SECTIONAL HANDLE

BACKGROUND OF THE INVENTION

The invention relates to sectional handles particularly those used on household utensils and similar articles.

Sectional handles have been known for many years and various types of sectional handles are available. They are particularly useful in connection with cooking utensils for camping and hiking where compact storage is essential. More recently, the use of facilities having very limited storage space, such as motor homes and trailers has focused much greater interest on the devices which permit compact storage. Even more recently, the trend in housing toward condominiums and apartments has made it essential that the limited storage space available be used as efficiently as possible. This is especially true in connection with utensils which are used only periodically such as barbecuing tools and popcorn poppers.

Previously available sectional handles have had two particularly undesirable characteristics. Such devices have been notoriously weak at the joints between the sections whereby the sections have a tendency to separate while in use. This is not only frustrating to the user but, in come cases can be exceedingly dangerous, particularly if hot liquids fat or the like are involved.

This lack of functionality arises from the fact that previously designed joints for the sectional handles do not provide a rigid attachment between the sections and also fail to provide a positive lock to prevent unintentional separation of the sections at the joint. Where it has been attempted to overcome this problem, the resulting product has been either too expensive or too cumbersome and heavy to be practical or in many cases a combination of both undesirable characteristics.

BRIEF SUMMARY OF THE INVENTION

The invention provides a handle, preferably consisting of an elongated loop of strong, rod-like material. The handle consists of one or more sections with each section having at one end, a plate spanning between and rigidly secured to the sides of the handle section. The plate, on each side, has ears bent over to form a trackway or slideway of a height and width to snugly and slidably receive the end of a similar section of handle or a projecting tab on the utensil itself. This slideway is of substantial length and is parallel to the face of the plate. The plate also has a projecting tongue-like portion which, at one end, has an upturned stop and a cooperating latch. The tongue is designed to be basically rigid but capable of deflection when sufficient pressure is applied. The stop and the latch cooperate to provide a lock whereby separation of the joint will not occur unless sufficient force is intentionally applied lengthwise of the handle to deflect this tongue enough to cause the latch to release.

BRIEF DESCRIPTION OF THE DRAWINGS

FIG. 1 is an oblique top view of a utensil equipped with this invention;

FIG. 2 is an enlarged plan view of the utensil with a sectional handle removed;

FIG. 3 is an enlarged end view of the utensil shown in FIG. 2 as viewed from the anchor pad end;

FIG. 4 is a fragmentary enlarged exploded view of the joints of a sectional handle as viewed from the bottom;

FIG. 5 is a view similar to FIG. 4 except it shows the joint with the two sections joined;

FIG. 6 is a fragmentary sectional view taken along the plane VI—VI of FIG. 5;

FIG. 7 is a fragmentary plan view of the plate portion of the joint;

FIG. 8 is a sectional view taken along the plane VIII—VIII of FIG. 7;

FIG. 9 is a view similar to FIG. 7 showing a modified form of the invention;

FIG. 10 is a sectional view taken along the plane X—X of FIG. 9;

FIG. 11 is a fragmentary plan view of the plate portion of the joint showing a modified form of the handle section;

FIG. 12 is a fragmentary oblique view of a modified construction for this invention; and FIG. 13 is a sectional view taken along the plane XIII—XIII of FIG. 12.

EMBODIMENTS OF THE INVENTION

The numeral 10 indicates a utensil which, for the purpose of illustrating the principles of this invention, is shown as a corn popper. It is to be understood that this invention is not limited to use with corn poppers or to use with any other particular type of utensil. For example, the invention could be applied as the sectional handle for a fork, a hot dog roaster or a frying pan.

The utensil has a frame 11, which in the preferred embodiment, is generally U-shaped, but may also be a closed loop. Secured to the frame and suspended within it is a web 12 of article supporting material. The web may be a solid sheet as illustrated or, as use demands, may be a screen or perforated sheet, the choice of web material being irrelevant to this invention.

At one end, the frame 11 is shaped to have an outwardly projecting portion or anchor tab 13. The tab 13 has parallel sides 14 and a closed end 15. Preferably, the anchor tab 13 is downwardly offset from the general plane of the remainder of the frame. The amount of the offset is generally that of the thickness of the sectional handle to be described. It is also contemplated within the scope of this invention that the anchor tab 13 could be inclined at a small angle either upwardly or downwardly with relation to the general plane of the remainder of the frame.

The handle 20 to be used with the utensil 10 can consist of one or more sections, depending on the length desired. In the particular form illustrated in FIG. 1, the handle consists of three sections 20a, 20b and 20c. These sections can be identical or as is illustrated in the case of 20c, the end section can be formed with suitable stops 21 to define the grip portion or, as is often done, to facilitate the mounting of some type of insulating material such as a wood block between the sides of the handle. This again is not part of the invention. Since, for the purposes of this invention, a description of one section and of one of the detachable joints by which the sections are joined together will suffice to explain the invention only one of the joints 30 will be described.

Referring now to FIGS. 4 through 10, the joint will be described. The body of each of the handle sections 20a or 20b consists of a loop of rod-like material of sufficient cross section and rigidity to withstand the loads imposed upon the handle during use. For this purpose, steel rod or heavy gauge steel wire provides a preferred material. The body of each of these sections is created by forming the rod-like material into an elongated, narrow, generally U-shaped member 23 having a pair of parallel spaced sides 24. As such, the body is generally an elongated relatively thin rectangular member with one end 25 closed and the other end free or open. The body could be an elongated loop closed at both ends.

A plate 31 is secured to the sides of the body at the open end. This plate is formed from a suitable high strength material such as steel sheet, which under proper circumstances, has a limited degree of resilient deflectability. The body of the plate extends between the two sides 24 of the handle section and along each side has a plurality of laterally extending projections. In the preferred form of this invention, these lateral projections are divided into a pair of ears 32 spaced apart lengthwise of the plate so that one is adjacent the forward or open end of the plate and the other is adjacent the rear end of the plate. Between the ears 32, a portion of the plate is bent to lay firmly against the surface of the body of the handle section and be secured to the handle by suitable means such as welding 33. When welding is not used, a modified construction can be utilized, as indicated in FIG. 10, where the projections which are shown in FIG. 8 are wrapped completely around the sides of the section body and thus form a wrapped joint. In this case, some type of mechanical lock, such as offset dimpling 39 should be used to prevent slippage of the plate along the handle body. Of course, if still further strength is desired, both the fully wrapped construction and welding may be used simultaneously.

The ears 32 are bent upwardly and inwardly in a direction away from the body of the handle section to form a slideway or trackway 34 (FIG. 8). The ears 32 cooperate with the main body of the plate 31 such that the slideway or trackway 34 they form with the body of the plate will snugly and slidably receive the closed end 25 and the adjacent side portions of another section of the handle or the anchor tab 13 of the utensil. In order to join one handle section to another it is necessary that the closed end of one handle section or the anchor tab 13 be telescopically inserted in the trackway or slideway by movement which is parallel to the plane of the plate because the snugness is such as to prevent anything but an accurate axial movement of the parts to occur.

The rearward end of the plate is narrowed so that it forms an elongated, rearwardly projecting tongue 35, the sides of which are spaced from and unattached to the sides 24 of the handle section. This tongue 35 forms a cantilevered, rearwardly extending projection which because of the nature of the material from which the anchor plate is formed has a limited degree of resilient, deflectability when sufficient force is applied to it. The rear end of f the tongue 35 is turned downwardly, that is, in the direction of offset of the ears 32. It thus forms a stop 36 extending partially across and blocking the end of the trackway or slideway 34. Also on the tongue, and spaced forwardly of the stop 36 is a latch member 37 which, in the illustrated, preferred embodiment, is a depending dimple 37. The spacing between the dimple 37 and the stop 36 is such that when two sections of the handle or the handle and the tab 13 on the utensil are joined the closed end 25 of one section is positively trapped between the dimple and the stop member, as is illustrated in FIG. 5. In order to do this, sufficient telescoping force must be applied to the two handle sections to cause the tongue 35 to be deflected sufficiently to permit the dimple or latch member 37 to rise and pass over the closed end 25. Since the anchor plate is made of a basically stiff material, this requires significant force and thus the combination of the dimple or latch member and the stop provide a positive lock, preventing accidental or unintentional sliding separation of the joint. This is most important in providing a positive, secure and dependable joint.

The remainder of the body of the plate 31 provides a rigid and positive connecting web between the sides 24 of the handle section to which it is mounted. To further reinforce this plate and to prevent any tendency of the plate to deflect, except in the tongue portion 35, an elongated central bead 38 is provided which extends substantially the full length of the main body portion of the plate. This bead is offset upwardly where it will not interfere with the sliding, telescopic engagement of the two sections. Its length is such that it prevents any type of wave-like deflection of the main body portion, thus, positively confining deflection to the tongue portion where it is essential to the latching action.

As is shown in FIG. 1 the preferred arrangement of this invention is with the plate arranged on the bottom side of the handle section to which it is permanently secured. Thus, when two handle sections are joined the handle section telescoped into the slideway, as for example, handle section 20a as illustrated in FIGS. 4 and 5, lies immediately beneath the body of the plate. This arrangement is a preferred one because when the handle is used the forces imposed on the joint tend to press the closed end 25 further against the tongue 35 and thus even more firmly into the trapped position between the latching member 37 and the stop 36. When so used, even though continued usage or misusage may slightly open the passageway formed by the ears 32, the latch will continue to function in a positive manner, thus preventing accidental telescopic disengagement, a fault commonly encountered in sectional handle constructions of conventional design. However, the joint created by this invention is of sufficient strength and durability that, if used in inverted position, if will still provide all of the advantages and functional improvements of this invention.

FIGS. 12 and 13 illustrate a modified form of this invention in which components similar to those illustrated in FIGS. 4 and 5 have like numbers. In this case, the plate is similar in function, and basically in form, to the plate 31, the only difference being that instead of having ears 32 which terminate just inwardly of the sides 24 of the handle section, the metal of the plate is formed into a tube-like structure 31a forming an enclosed slideway or passageway 34a at each end. Where the tube-like structure substitutes an arch 40 for the ears 32, it may be further reinforced by suitable offset beading 41 to further stiffen the structure. This type of an arrangement may be desirable if the invention is to be applied to exceptionally heavy loads or is to be used under abusive conditions. Although such a construction would be more expensive, it incorporates the principles of the invention.

It will be seen that this invention provides a positive, high strength joint by which sectional handles may be attached to a utensil or the various sections of the handle joined one to another. The invention provides a detachable and/or sectional handle which is dependable and durable without undue complication and excessive manufacturing costs. It is also relatively lightweight and thus is particularly suitable for conditions where weight is an important factor such as in camping and in hiking.

While a preferred embodiment of the invention has been illustrated together with two modifications, it will be understood that various other modifications may be made of the invention without departing from the principles of the invention. It is intended that such modifications encompassing the invention be included unless the hereinafter appended claims specifically state otherwise.

The embodiments of the invention in which an exclusive property or privilege is claimed are defined as follows:

1. A separable joint for a sectional article support, each section of said article support being an elongated, narrow loop of rod-like material having at least one closed end; a plate rigidly secured to one face of one of said sections at the end thereof remote from said closed end; said plate opposite from said one section to which it is secured, having means forming an elongated trackway parallel to said one section of a height and width to snugly and slidably receive the closed end of the other of said sections; said plate having a forward end and a rearward end, said forward end being adjacent the end of said one section; and rearward end having a rearwardly projecting tongue spaced from the sides of said one section; a cooperating stop and latch means on said tongue; said tongue being resiliently deflectable whereby said stop and latch means can detachably engage the closed end of said other section.

2. A separable joint for a sectional article support, each section of said article support having a pair of elongated, spaced, generally parallel rod-like members joined together at one end; a plate rigidly secured to one face of both of said members at the other end of each of said sections; said plate opposite from said members to which it is secured, having means forming an elongated trackway parallel to said members of a height and width to snugly and slidably receive the one end of another section; said plate having a forward end and a rearward end, said forward end being adjacent the end of said one section; said rearward end having a rearwardly projecting tongue spaced from both of said members of said one section; a cooperating stop and latch means on said tongue; said tongue being resiliently deflectable whereby said stop and latch means can detachably engage said one end of said other section.

3. A separable joint for a sectional article support, each section of said article support being an elongated, narrow loop of rod-like material having at least one closed end; a plate having laterally extending portions on each side; said plate being rigidly secured to one face of one of said sections at the end thereof remote from said one closed end; said plate, on each side having ears projecting out of the plane of said plate oppositely from the section to which said plate is secured; the free ends of said ears being bent over to extend toward each other generally parallel to said plate and forming an elongated trackway of a height and width to snugly and slidably receive said one closed end of the other of said sections; the end of said plate remote from the free end of the section to which the plate is secured having a stop for engaging the closed end of said other section; latch means for detachably holding said closed end against said stop.

4. A separable joint for a sectional article support as described in claim 3 wherein said ears are spaced lengthwise of said plate; the sides of said plate, between said ears being wrapped around the sides of said one section for securing said plate thereto.

5. A separable joint for a sectional article support as described in claim 3 wherein said ears are spaced lengthwise of said plate, the sides of said plate between said ears being shaped to seat against the sides of said one section and welded thereto.

6. A separable joint for a sectional article support as described in claim 3 wherein said latch means is an upstanding dimple spaced from said stop the thickness of said one closed end of said other section.

7. A separable joint for a sectional article support as described in claim 3 wherein said plate at the end thereof remote from the free end of the section to which it is attached has a tongue extending lengthwise of said section in the plate of said plate, said tongue being spaced from the sides of said section to provide a resiliently deflectable projection on said plate, said stop and latch means being located on said tongue whereby said latch means can be deflected to pass the closed end of said other section over it.

8. A separable joint for a sectional article support as described in claim 7 wherein a bead is formed in said plate extending lengthwise thereof in the portion of said plate between said ears and offset oppositely from said ears.

9. A separable joint for a sectional article support as described in claim 3 wherein the other end of each of said sections is open and said plate forms a rigid cross web between the free ends of the sides of the section at said open end.

10. An article having a sectional handle, said article comprising: a frame for the article, said frame being a closed loop of rod-like material; said frame having one portion projecting outwardly therefrom to provide a narrow generally U-shaped frame supporting anchor tab having parallel sides and a closed end; the body of said handle being an elongated, narrow loop of rod-like material having at least one closed end; a plate rigidly secured to one face of said handle and spanning the width between its sides; said plate on the face opposite from said handle body having means forming an elongated trackway parallel to said handle and of a height and width to snugly and slidably receive the closed end of said anchor tab; said plate having a forward end and a rearward end, said forward end being adjacent the end of said handle; said rearward end having a rearwardly projecting tongue spaced from the sides of said handle; a cooperating stop and latch means on said tongue; said tongue being resiliently deflectable whereby said tab can be inserted into said slideway until it passes over latch means and engages said stop to secure said closed end of said anchor tab to said handle.

11. An article as described in claim 10 wherein said anchor tab is offset downwardly from the remainder of said frame.

* * * * *